United States Patent [19]
Wright et al.

[11] Patent Number: 5,729,270
[45] Date of Patent: Mar. 17, 1998

[54] TONER CONSERVATION BY PEL MODULATION WITH OPERATOR CONTROL

[75] Inventors: Phillip Byron Wright; Dale Randal Danner; Martin Victor DiGirolamo; Gary Scott Overall; John Parker Richey, all of Lexington, Ky.

[73] Assignee: Lexmark International, Inc., Lexington, Ky.

[21] Appl. No.: 280,957

[22] Filed: Jul. 27, 1994

[51] Int. Cl.[6] .............. B41J 2/415; B41J 2/385; H04N 1/21; G02B 26/08
[52] U.S. Cl. ............ 347/131; 358/298; 358/300; 358/456; 347/138; 347/140
[58] Field of Search ................ 358/456, 298, 358/296, 300, 448; 347/129, 131; 395/117, 132

[56] References Cited

U.S. PATENT DOCUMENTS

| | | | |
|---|---|---|---|
| 5,317,679 | 5/1994 | Ueda | 395/132 |
| 5,349,377 | 9/1994 | Gilliland | 347/131 |
| 5,483,625 | 1/1996 | Robertson et al. | 395/117 |
| 5,493,320 | 2/1996 | Sandback, Jr. et al. | 347/47 |

FOREIGN PATENT DOCUMENTS

| | | | |
|---|---|---|---|
| 0 356 038 A2 | 2/1990 | European Pat. Off. | B41J 2/455 |
| 0 425 152 A1 | 5/1991 | European Pat. Off. | G06K 15/14 |
| A-05 169 664 | 7/1993 | Japan | B41J 2/05 |
| A-05 309 871 | 11/1994 | Japan | B41J 2/485 |
| A-7 107280 | 4/1995 | Japan | H04N 1/40 |

OTHER PUBLICATIONS

DP-Tek, Inc, Technical Disclosure; Tonemiser, Jul. 12, 1994.

*Primary Examiner*—Benjamin R. Fuller
*Assistant Examiner*—Raquel Yvette Gordon
*Attorney, Agent, or Firm*—John A. Brady

[57] ABSTRACT

Toner is conserved in printer (1) under operator control by changing the final modulation for each bit in a bit map depending on whether the bit is an edge bit or an internal bit in the character being printed. Since only the final modulation is affected, processing speed and efficiency are not degraded. The operator can select various degrees of internal gray and internal white. Some levels of gray may be satisfactory for some final correspondence.

2 Claims, 6 Drawing Sheets

*M M*

TONER CONSERVATION BY PEL MODULATION WITH OPERATOR CONTROL

TECHNICAL FIELD

This invention relates to electrophotographic imaging with toner, such as by xerographic copiers and by xerographic laser printers, in which the use of toner is controlled to save material costs by using less toner.

BACKGROUND OF THE INVENTION

Conservation of toner in prior xerographic systems takes the form of a draft mode or of overall density control. The assignee of this invention has sold commercially for several years laser printers which permit density control of an entire page among high, medium, and low under operator control. None of these densities is so light as to be perceived as a gray in final printing, and the purpose of selecting one may be both to minimize the use of toner and to produce a black density which is satisfactory, or even preferred, to the operator. The saving of toner is a stated advantage of the selection of less than highest density. The change in density is implemented by changing the light modulation for each bit of the data map, specifically by illuminating fewer of a set of contiguous vertical slices corresponding to a bit in the bit map of the image being formed.

In another commercial xerographic laser printer which is prior to this invention, a draft mode prints a dark outline of characters with a gray fill internal to the outline. It is also known to simply print gray characters in a draft mode. The manners of implementation of such modes could vary.

The foregoing known prior laser printer appears to print the gray by printing full bits while not printing other full bits.

In certain non-xerographic implementations a draft mode is associated with faster speed as well as a change in print quality. In wire matrix printers, which employ columns of small wires to impact a marking material to form images, the wires have a limited recovery time, so eliminating dots in images permits higher speeds. Higher speeds, however, are not generally a result of toner conservation in laser printers since the maximum speed of laser printers are not limited by the complexity of the final bit image to be printed.

The speed of laser printers can be limited by the time for their central processing unit to define a final bit image to be printed. Thus, if a toner conservation mode were to require derivation of a new or more complex mapping of bits or definition of the function of bits, this would be a serious defect.

U.S. Pat. No. 5,317,679 to Ueda et al is for edge smoothing to remove stair steps in which emphasis of edges is avoided.

DISCLOSURE OF THE INVENTION

In accordance with this invention, toner conservation is offered in which images have a dark outline and the operator may select the density of the internal area. With a dark outline, an internal area which would be perceived alone as dark gray may nevertheless be suitable for much correspondence, thereby saving toner on many documents, including some final correspondence. This is achieved without redefining the bit map, but instead by logical observation of the final bit map and then changing the final modulation for each bit in accordance with the logic. The final modulation may be changed without redefining the bit map and by only a straightforward change in logic of a system employed to remove the stair step appearance of bit mapped images, known as enhancement of resolution.

DESCRIPTION OF THE DRAWING

The details of this invention will be described in connection with the accompanying drawing, in which FIG. 4 shows the letter M as seen after printing in black outline with FIG. 4a suggesting lighter internal printing and FIG. 4b showing only an outline, both in accordance with the conservation printing of this invention.

BEST MODE FOR CARRYING OUT THE INVENTION

Figure 1:
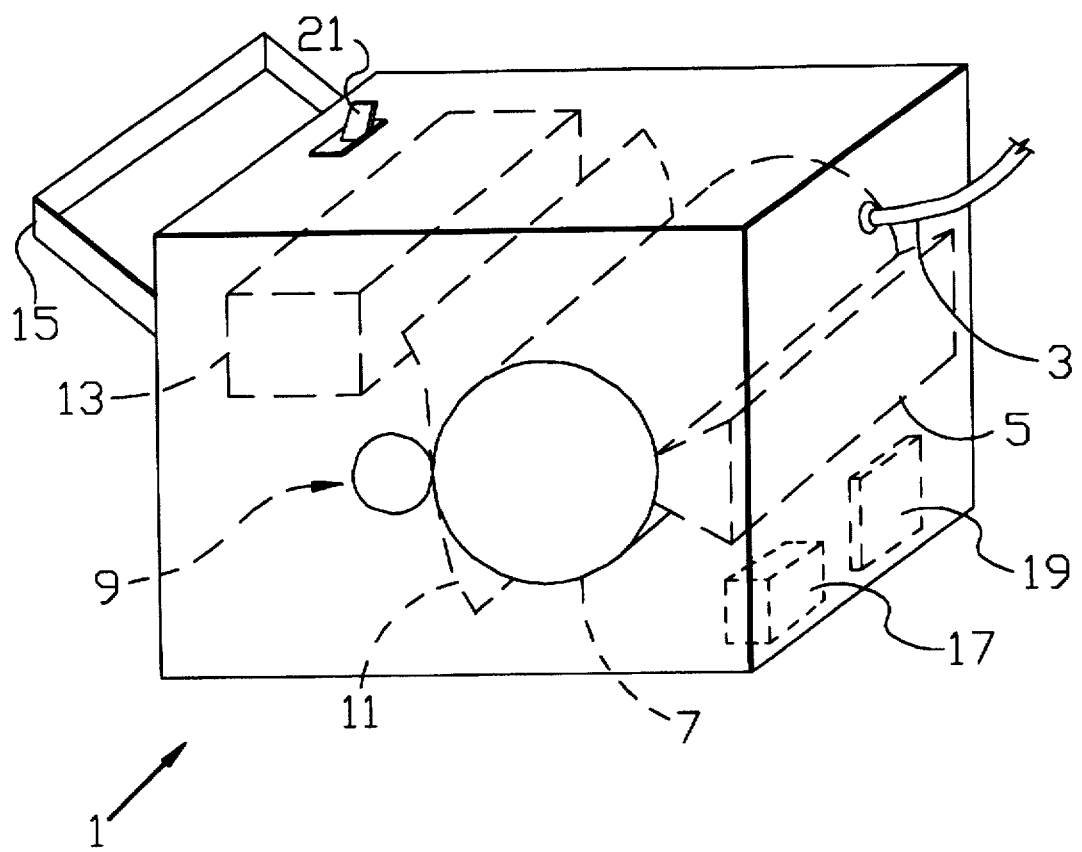
FIG. 1 illustrates a printer with which this invention is practiced.

The preferred embodiment of this invention is implemented as a laser or LED printer, such as printer 1, receiving control information in a standard manner from a communications cable 3 as shown illustratively in FIG. 1. Since the printer 1 may be largely pre-existing, such as in the 4039 LaserPrinter or the 4037 page printer sold by the assignee of this invention, most aspects of printer 1 will be described only very generally and aspects not interoperative with this invention may not be mentioned. The following description given is primarily to an embodiment in a laser printer.

Printer 1 has an optical system 5 operative on drum 7. Drum 7 transfers image defined by optical system 5 at transfer station 9 to paper 11. The image is fixed, typically by heat, at fixing station 13, and the finished printed page is delivered to output tray 15.

Data processor 17 in printer 1 monitors the data received and interprets the data in accordance to the control language or other mode to which the data processor is set. Information received on cable 3, as well as other information, is stored electronically in memory 19. The degree of toner conservation is selected by the person operating printer 1 from a control panel, illustrated symbolically by a switch 21.

FIGS. 2 and 3 show alternative modulations of final printing with respect to each bit in an electronic map defining the image. FIG. 2 shows modulation in accordance with the preferred embodiment of this invention. The squares 20 shown in FIG. 2 represent 1/300 inch in length and width of the final image, which is the size in the final image which one bit in the bit map defines the significance of. The square 20 of FIG. 2 can also be considered to represent the actual surface of the photoconductor 7 subjected to discharging light by optical system 5 in the preferred embodiment. (The bits in a bit map may be one or zero, which significance defines between different colors, typically between white or black. The actual printing in each bit area may be varied from the significance in the electronic map as will be apparent from the following discussion.)

FIG. 2 has dotted lines in each square 20 suggesting eight sections 22a through 22g extending the full 1/300 inch vertically and 1/2400 inch horizontally. That configuration is the optical capability to illuminate or not illuminate photoconductor 7 of the optical system 5 in the preferred embodiment. Since the eight sections are very thin, a discharged photoconductive drum 7, when toned to develop the image, tends to receive toner in a pattern which will average the illumination pattern. Similarly, human vision tends to average the small patterns. Thus, variations within the square 20 are functionally shades of darkness or gray throughout the square 20.

Figure 2A:
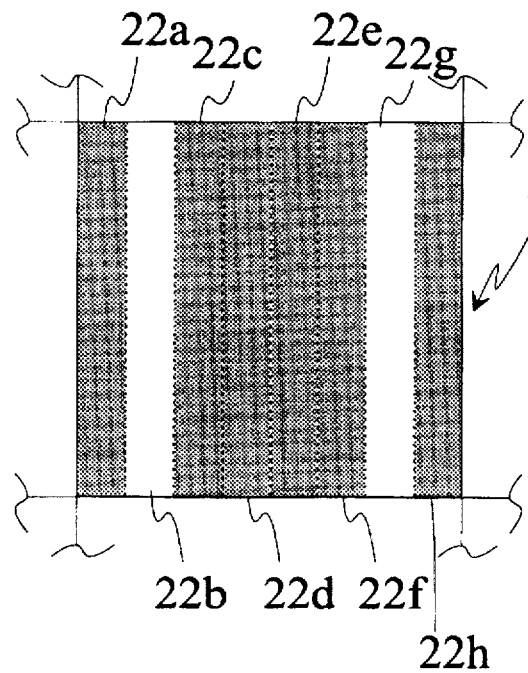
FIGS. 2a–2c illustrate different modulations of the preferred embodiment, which may be on the photoconductor or as they ideally might appear on the final image.

FIG. 2a shows square 20a having six vertical sections 22a, 22c, 22d, 22e, 22f and 22h, of the eight sections 22a–22h illuminated (darkened areas suggest illumination). Since development in the preferred embodiment is by reverse transfer from a developer roller (i.e., toner is attracted to discharged portion of drum), the illumination of FIG. 2a is that of a medium heavy dark area. Typically, the modulation of FIG. 2a may be the discharge pattern for the darkest area formed.

Figure 2B:
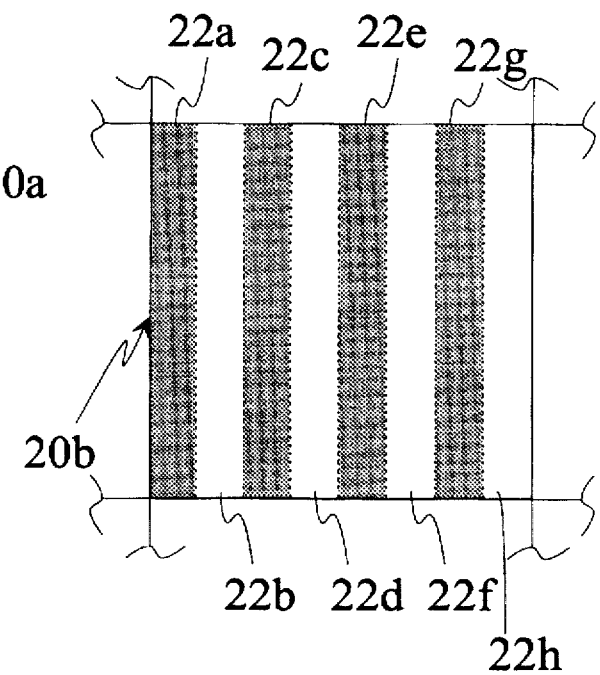

FIG. 2b shows alternate sections 22a, 22c, 22e, and 22g illuminated. This would produce a medium gray in the area of the final image defined by one pel in the bit map for which the final image is modulated in accordance with FIG. 2b.

Figure 2C:
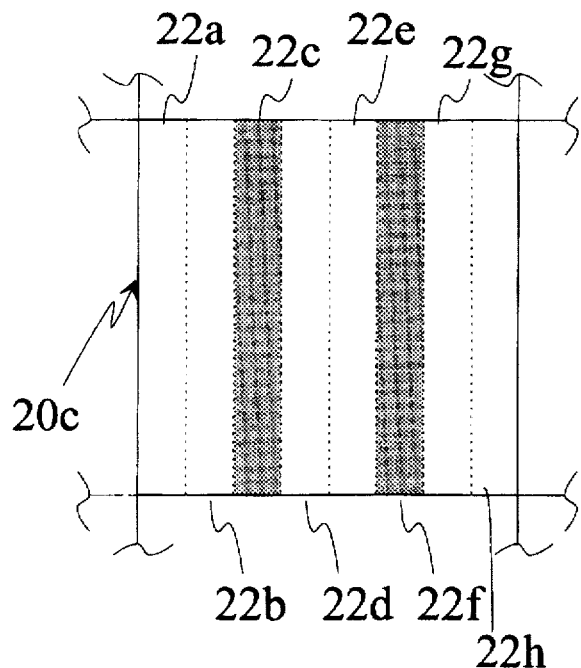

FIG. 2c shows only two sections, 22c and 22f, illuminated. This would produce a light gray in the area of the final image defined by one pel in the bit map for which the final image is modulated in accordance with FIG. 2c. In the embodiment illustrated operating at 600×600 dpi the modulation in each bit area would be four vertical sections. The preferred embodiment in a page wide LED printer would be the corresponding orthogonal matrix to those shown in FIG. 2, with the modulation for each area being for five horizontal sections.

Figure 3A:
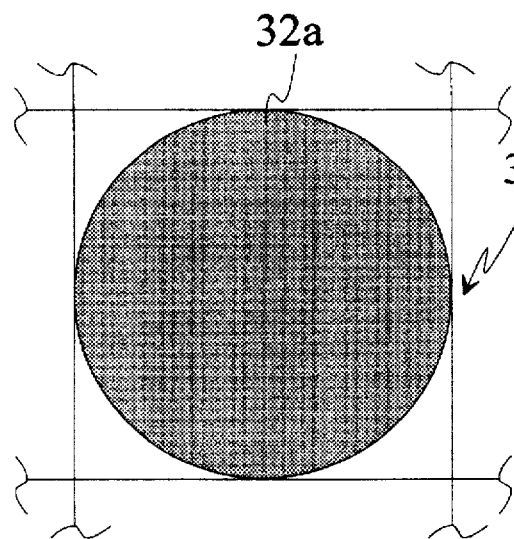
FIGS. 3a–3c illustrate different modulations corresponding to FIG. 2 but of alternative embodiments.
Figure 3B:
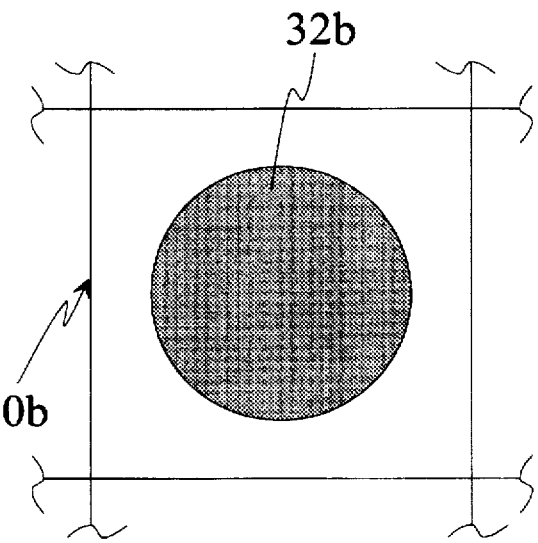
Figure 3C:
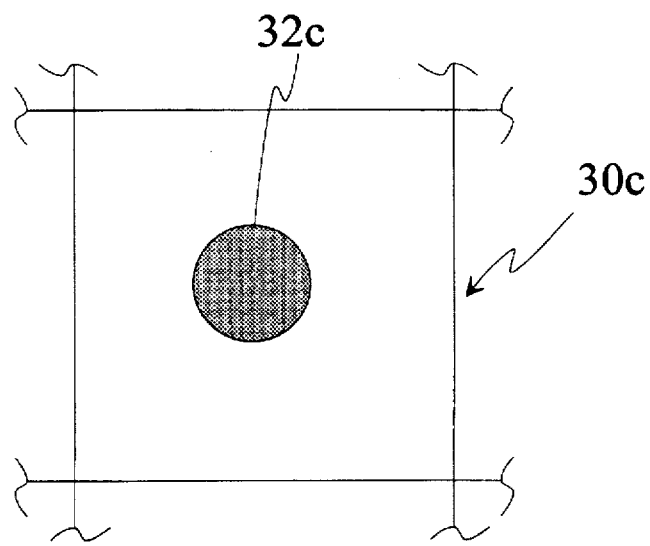

The FIG. 3 illustrations are for ink jet printing and would typically be for final images of 1/300 inch in length and width because of limitations in the capabilities of ink jet printing. In FIG. 3 the change in modulation is by circles of different diameters forming continous areas of different size. Light images are capable of being changed in this manner. Similarly, ink jet drops can be changed in size by known printhead techniques. Thus, FIG. 3a shows a square 30a representing the size corresponding to one bit in the bit map with modulation image 32a almost filling the square 30a. Assuming the image 32a is an ink drop or illumination to be reverse developed, this would constitute a full black final image. FIG. 3b shows a bit-size square 30b with modulation image 32b covering about the center one-half of square 30b. In the same imaging system as just assumed for FIG. 3a, this would constitute a dark gray final image. Similarly, FIG. 3c shows a bit-size square 30c with a dot 32c covering the center one-fourth of square 30c, producing a light-gray final image.

Figures 4A, 4B, 5:
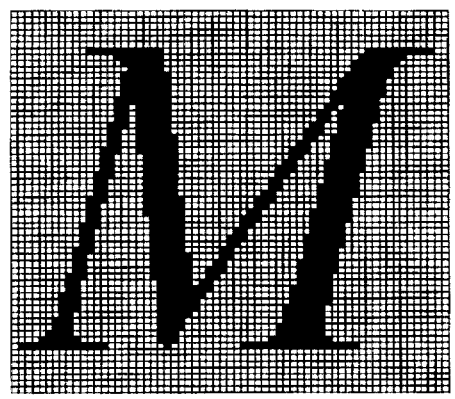
FIG. 5 illustrates a bit map, which may be in electronic memory, storing the pattern for the letter M, which would appear as shown if transcribed exactly.

FIG. 4a is suggestive of the letter M printed in the conservation mode of this invention, with the outline printed, for example, with the modulation of FIG. 2a or FIG. 3a, and the internal portions printed with the modulation of, for example, FIG. 2b or FIG. 3b. FIG. 4b represents the most extreme conservation in that the internal portions are not printed at all and are therefore typically white.

Existing printers, as mentioned, employ data processing apparatus, such a data processor 17 to create a bit map in a given resolution, in the preferred embodiment, 300×300 dpi (dots per inch resolution). Such a bit map is shown illustratively in FIG. 5, showing a letter M in such a bit map. The bit map is stored electronically in an electronic memory 19. (As such it may be compressed by coding or dispersed and related by address pointers, but such techniques are irrelevant to this invention.) Each bit 40 in memory 19 defines a significance (such as white or black)) exclusive to one 1/300 inch square in the final image.

Figure 6:
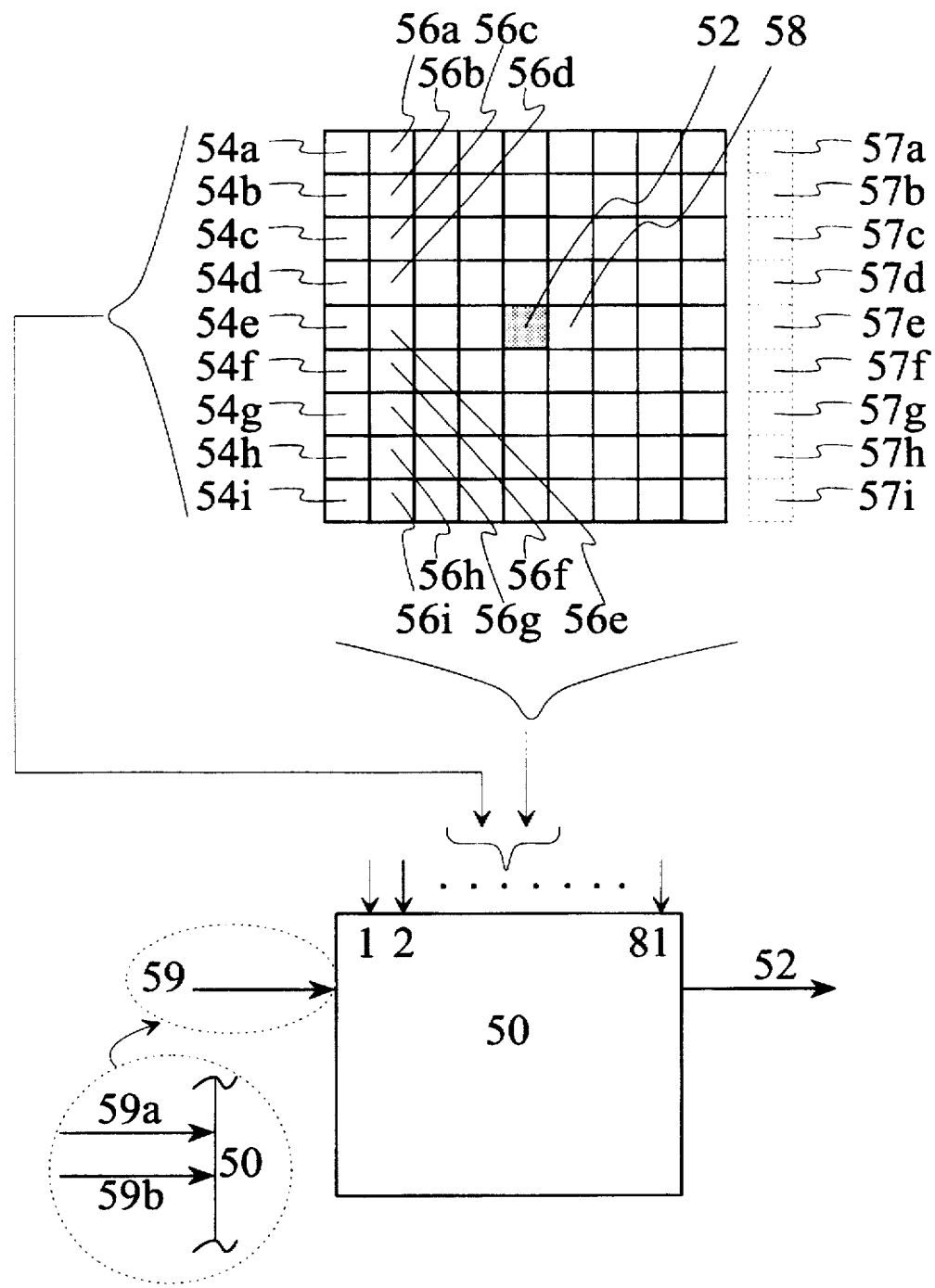
FIG. 6 illustrates logic to define the modulation for bits in a bit map such as that of FIG. 5.

As is done for enhancement of resolution in the previously-mentioned, existing 4039 printer, a block of contiguous data from the electronic bit map 19 is examined in logic 50 of FIG. 6 and modified by the result of such logic. Logic 50 is preferably combinational logic controlled by and part of data processor 17. The section of the bit map examined is a 9×9 matrix which receives signals for 9 rows stepped through the matrix. Only the modulation of the center bit 52 is determined. Upon determination of that modulation, the row data is advanced one bit position, thus moving bits 54a–54i out of the logic, replacing them with those bits in the immediately adjacent column of "bits" 56a–56i, and introducing bits 57a–57i into the 9×9 section of memory 19 being examined (formerly just out of this section). Bit 58 becomes the new data bit, whose modulation is then defined by the logic, 50. Eighty-one input lines, one for each bit in the section of memory 19 being examined, are applied as data inputs to logic 50, although not all are required for conservation mode.

Figure 7:
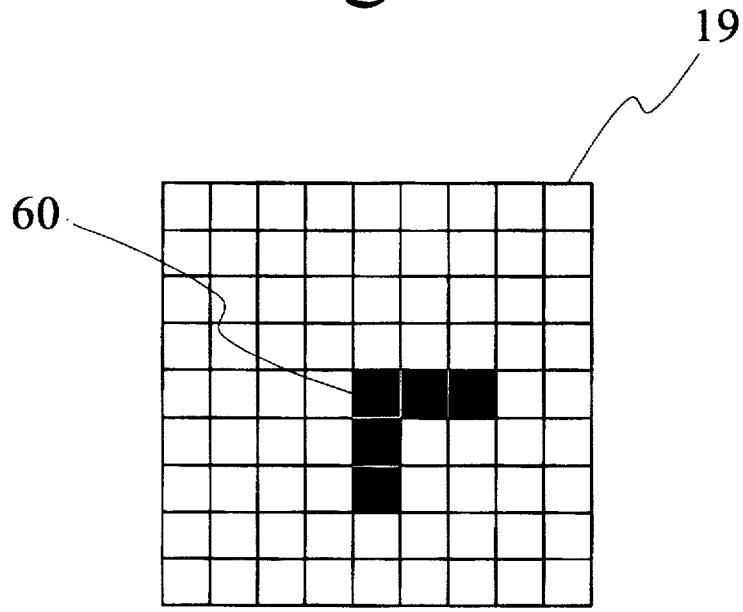
FIG. 7 shows a bit map pattern which the logic of FIG. 6 would recognize as an edge.

FIG. 7 is a simplified pattern to be detected by logic 50, defining an edge. Bit 60 is an edge because it is not totally surrounded horizontally, vertically and diagonally by black bits and is itself of black significance. The modulation for bit 60, whether in a conservation mode or not, would be for dark, shown, for example in FIG. 2a and FIG. 3a (or as may be modified moderately from full dark for enhancement of resolution, which forms no part of this invention). Of course, FIG. 7 is illustrative also in that is shows only one of many configurations of bits which are an edge.

Figure 8:
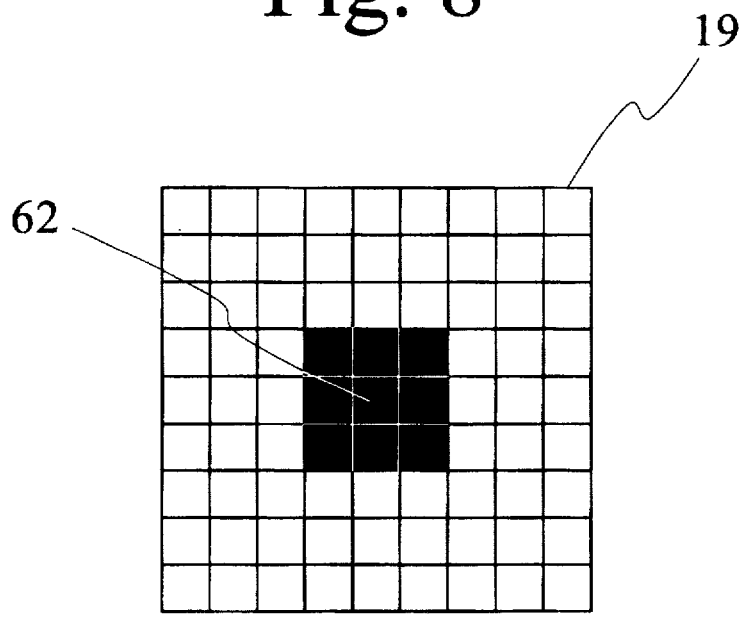
FIG. 8 shows a bit map pattern which the logic of FIG. 6 would recognize as an interior.

FIG. 8 shows a simplified pattern, to be detected by logic 50, defining an internal area within an image. Bit 62 is internal because it is immediately surrounded, horizontally, vertically, and diagonally by black bits and is itself of black significance. In a toner conservation mode, the modulation of bit 62 would be for light, shown, f.,or example, in FIG. 2b and FIG. 2c and FIG. 3b and FIG. 3c.

Modification of existing resolution enhancement combinational logic to detect the foregoing internal bits when a control signal on input 59 is actuated to call for the conservation mode is clearly straightforward and will not be detailed. Detection of the edge bits is already the essential function of the pre-existing enhancement of resolution logic, although for the purpose of changing the modulation near edges to smooth stair step appearances. In accordance with this invention that function is not modified. This produces dark edges as are desired in accordance with this invention, which are smoothed with respect to stair step, which is entirely consistent with this invention.

This invention is thereby achieved by the use of logic 50 acting on signals defining the significance of the neighborhood surrounding each bit on an output line 52. Since logic acting on such signals is already employed for enhancement of resolution, the physical change to implement the conservation mode requires only essentially one signal to the logic to define the activity of a conservation mode and a trivial change to the previous logic to sense internal bits as described with respect to FIG. 8 and produce a modulation output on line 52 (FIG. 6) which is that of an internal bit. A signal on line 59, selected by the operator of printer 1, causes logic 50 to select the light, internal modulation selected by the operator, which might be one of FIG. 2b or FIG. 3c modulation or FIG. 3b or FIG. 3c modulation. Ideally, the modulation would have a wide variation, such as the circle modulation of FIG. 3 being infinitely variable. As an alternative, where only a range of discrete modulations are available, as in the case of the FIG. 2 modulation, the logic 50 can have a separate inputs 59a and 59b, to select each modulation with the internal logic 50 producing a different internal modulation signal depending upon the existence of a selection signal to input 59a or input 59b.

With a range of pel modulations available, the operator of printer 1 can select different conservation modes for different purposes. Where the internal gray is selected as fairly dark, this may be deemed adequate by the operator of printer 1 for final correspondence and used for that purpose, thereby achieving toner conservation even in final correspondence.

The heavy black edge of the draft mode for this invention may be widened, for example, to the next internal bit, with further internal bits being lighter as described. Other variations within the spirit and scope of this invention may be anticipated.

What is claimed is:

1. Imaging apparatus comprising electrostatic image forming apparatus means to develop images formed by said electrostatic image forming apparatus with toner, and means to transfer said toned images to paper or other substrate as permanent images, said electrostatic image forming apparatus including an electrostatic discharge printhead operative to discharge a charged electrostatic surface to form image areas to be toned, each of said image areas being located at different bit locations of said images formed by said electrostatic image forming apparatus, first ones of said image areas being of one size less than or equal to a first size, said first size being a size of bits in said images formed by said electrostatic image forming apparatus, and second ones of said image areas being a second size less in size than said one size, electronic data processing apparatus to form an electronic bit map defining a dark or light significance of bits of an image, each bit of said electronic bit map defining a bit in said image formed by said electrostatic image forming apparatus of said first size, and electronic logic and control apparatus to receive as inputs a dark or light significance of bits in a selected contiguous region of bits in said electronic bit map and to define a size of said discharge by said printhead for individual bits of said electronic bit map, said electronic logic and control apparatus defining discharge by said printhead of image bits forming edges of images to be charged when charged areas are toned or to be discharged when discharged areas are toned in said one size to form said first ones of said image areas to produce a dark outline and defining discharge by said printhead of image bits internal to said bits forming edges to be charged when charged areas are toned or to be discharged when discharged areas are toned in said second size to form said second ones of said image areas to produce images less dark than said dark outline within a dark outline.

2. The imaging apparatus as in claim 1 in which said printhead is operative to discharge said first ones of said image areas by discharging a continuous area of a predetermined size and said printhead is operative to discharge said second ones of said image areas by discharging a continuous area larger or smaller than said predetermined size.

* * * * *